(12) United States Patent
Hannuksela

(10) Patent No.: US 7,116,714 B2
(45) Date of Patent: Oct. 3, 2006

(54) VIDEO CODING

(75) Inventor: Miska Hannuksela, Tampere (FI)

(73) Assignee: Nokia Corporation, Espoo (FI)

( * ) Notice: Subject to any disclaimer, the term of this patent is extended or adjusted under 35 U.S.C. 154(b) by 675 days.

(21) Appl. No.: 09/924,582

(22) Filed: Aug. 9, 2001

(65) Prior Publication Data

US 2002/0054641 A1    May 9, 2002

(30) Foreign Application Priority Data

Aug. 14, 2000  (GB)  ................................. 0019983.6

(51) Int. Cl.
*H04N 7/12* (2006.01)
(52) U.S. Cl. ................. 375/240.12; 382/236
(58) Field of Classification Search ........... 375/240.12, 375/240.27, 240.01, 240.13, 240.15; 382/236
See application file for complete search history.

(56) References Cited

U.S. PATENT DOCUMENTS

| | | | |
|---|---|---|---|
| 5,436,664 A | | 7/1995 | Henry |
| 5,442,400 A | | 8/1995 | Sun et al. |
| 5,680,322 A | | 10/1997 | Shinoda |
| 6,028,631 A | * | 2/2000 | Nakaya et al. ......... 375/240.01 |
| 6,404,814 B1 | * | 6/2002 | Apostolopoulos et al. ....... 375/240.12 |
| 6,591,014 B1 | * | 7/2003 | Ueda ........................ 382/236 |
| 6,611,561 B1 | * | 8/2003 | Hannuksela et al. ... 375/240.27 |

FOREIGN PATENT DOCUMENTS

EP    0 920 214    6/1999

OTHER PUBLICATIONS

European Search Report.
PCT International Search Report Reference No.: PAT00409/PCT; International Application No. PCT/EP01/09220; Applicant: Nokia Mobile Phones Limited.
Kim C-S et al., "An Error Detection And Recovery Algorithem For Compressed Video Signal Using Source Level Redundancy" IEEE Transactions on Image Processing, IEEE Inc., New York, US, vol. 9, No. 2, Feb. 2000, pp. 209-219; XP000912583 ISSN: 1057-7149 and Abstract.
Esteban Rodriguez-Market et al, entitled Video Coding Over Packet-Erasure Channels, School of EECS, Washington STate University, Pullman, WA 99164-2752, 0-8186-8821-1/98 © 1998 IEEE, pp. 314-318.

* cited by examiner

*Primary Examiner*—Gims Philippe
(74) *Attorney, Agent, or Firm*—Foley & Lardner, LLP (57) ABSTRACT

A method of encoding a video signal representing a sequence of pictures, the method comprising encoding a first picture (or segment of a picture) of the sequence without reference to another picture of the sequence to produce a picture (10) and encoding said first picture (or segment of a picture) with reference to another picture (14) of the sequence to produce a corresponding temporally predicted picture (P4) or segment of a picture.

39 Claims, 7 Drawing Sheets

VIDEO CODING

BACKGROUND OF THE INVENTION

This invention relates to video coding.

DESCRIPTION OF THE PRIOR ART

A video sequence consists of a series of still pictures or frames. Video compression methods are based on reducing the redundant and perceptually irrelevant parts of video sequences. The redundancy in video sequences can be categorised into spectral, spatial and temporal redundancy. Spectral redundancy refers to the similarity between the different colour components of the same picture. Spatial redundancy results from the similarity between neighbouring pixels in a picture. Temporal redundancy exists because objects appearing in a previous image are also likely to appear in the current image. Compression can be achieved by taking advantage of this temporal redundancy and predicting the current picture from another picture, termed an anchor or reference picture. Further compression is achieved by generating motion compensation data that describes the motion between the current picture and the previous picture.

However, sufficient compression cannot usually be achieved by only reducing the inherent redundancy of the sequence. Thus, video encoders also try to reduce the quality of those parts of the video sequence which are subjectively less important. In addition, the redundancy of the encoded bit-stream is reduced by means of efficient lossless coding of compression parameters and coefficients. The main technique is to use variable length codes.

Video compression methods typically differentiate between pictures that utilise temporal redundancy reduction and those that do not. Compressed pictures that do not utilise temporal redundancy reduction methods are usually called INTRA or I-frames or I-pictures. Temporally predicted images are usually forwardly predicted from a picture occurring before the current picture and are called INTER or P-frames or P-pictures. In the INTER frame case, the predicted motion-compensated picture is rarely precise enough and therefore a spatially compressed prediction error frame is associated with each INTER frame. INTER pictures may contain INTRA-coded areas.

Many video compression schemes also use temporally bi-directionally predicted frames, which are commonly referred to as B-pictures or B frames. B-pictures are inserted between anchor picture pairs of I- and/or P-frames and are predicted from either one or both of these anchor pictures. B-pictures normally yield increased compression compared with forward-predicted pictures. B-pictures are not used as anchor pictures, i.e., other pictures are not predicted from them. Therefore they can be discarded (intentionally or unintentionally) without impacting the picture quality of future pictures. While B-pictures may improve compression performance as compared with P-pictures, their generation requires greater computational complexity and memoiy usage, and they introduce additional delays. This may not be a problem for non-real time applications such as video streaming but may cause problems in real-time applications such as video-conferencing.

A compressed video clip typically consists of a sequence of pictures, which can be roughly categorised into temporally independent INTRA pictures and temporally differentially coded INTER pictures. Since the compression efficiency in INTRA pictures is normally lower than in INTER pictures, INTRA pictures are used sparingly, especially in low bit-rate applications.

A video sequence may consist of a number of scenes or shots. The picture contents may be remarkably different from one scene to another, and therefore the first picture of a scene is typically INTRA-coded. There are frequent scene changes in television and film material, whereas scene cuts are relatively rare in video conferencing. In addition, INTRA pictures are typically inserted to stop temporal propagation of transmission errors in a reconstructed video signal and to provide random access points to a video bit-stream.

Compressed video is easily corrupted by transmission errors, for a variety of reasons. Firstly, due to utilisation of temporal predictive differential coding (INTER frames), an error is propagated both spatially and temporally. In practice this means that, once an error occurs, it is easily visible to the human eye for a relatively long time. Especially susceptible are transmissions at low bit-rates where there are only a few INTRA-coded frames, so temporal error propagation is not stopped for some time. Secondly, the use of variable length codes increases the susceptibility to errors. When a bit error alters a codeword, the decoder loses codeword synchronisation and also decodes subsequent error-free codewords (comprising several bits) incorrectly until the next synchronisation (or start) code. A synchronisation code is a bit pattern which cannot be generated from any legal combination of other codewords and such codes are added to the bit stream at intervals to enable re-synchronisation. In addition, errors occur when data is lost during transmission. For example, in video applications using the unreliable User Datagram Protocol (UDP) transport protocol in IP networks, network elements may discard parts of the encoded video bit-stream. Additionally, the size of an encoded INTRA picture is typically significantly larger than that of an encoded INTER picture. When periodic INTRA frames are encoded, it may therefore be more likely that an INTRA picture would be corrupted.

There are many ways for the receiver to address the corruption introduced in the transmission path. In general, on receipt of a signal, transmission errors are first detected and then corrected or concealed by the receiver. Error correction refers to the process of recovering the erroneous data perfectly as if no errors had been introduced in the first place. Error concealment refers to the process of concealing the effects of transmission errors so that they are hardly visible in the reconstructed video sequence. Typically some amount of redundancy is added by the source or transport coding in order to facilitate error detection, correction and concealment.

In streaming applications, the demultiplexing-decompression-playback chain can be done while still downloading subsequent parts of the clip. In this case, a client may request retransmission of a corrupted INTRA picture. However, sometimes the streaming server may not be able to respond to such requests or the communication protocol between the streaming server and the client may not be able to transmit such requests. For example, the server may send a multicast stream, i.e., a single stream for multiple clients. If one of the clients receives a corrupted INTRA picture and sends a request for retransmission, the multicasting server would either send the retransmitted INTRA picture to all clients using the multicast channel or open an additional unicast channel for retransmission to the specific client. The former case increases network traffic unnecessarily for the majority of clients and the latter case complicates applications and network resource allocations. RTCP (real Time Control Protocol) is an example of a transport protocol incapable of requesting retransmissions of specific pictures. Servers cannot determine which pictures to retransmit based on the receiver reports provided by RTCP.

Current video coding standards define a syntax for a self-sufficient video bit-stream. The most popular standards at the time of writing are ITU-T Recommendation H.263, "Video Coding for Low Bit Rate Communication", February 1998; ISO/IEC 14496-2, "Generic Coding of Audio-Visual Objects. Part 2: Visual", 1999 (known as MPEG-4); and ITU-T Recommendation H.262 (ISO/IEC 13818-2) (known as MPEG-2). These standards define a syntax for bit-streams and correspondingly for image sequences and images.

Some video coding schemes, such as ITU-T H.263 Annex N Reference Picture Selection (RPS) mode, include an indicator or indicator(s) to the prediction reference frame of an INTER frame.

Video Redundancy Coding (VRC) is also described in Annex N of H.263. In VRC, multiple "threads" of independently coded INTER-pictures are generated. Corruption of a frame in one thread will therefore not affect the decoding of the other threads. Periodically, all the threads converge to a so-called sync frame which may be an INTRA-picture or a non-INTRA picture that is redundantly represented within all threads. From this sync frame, all the independent threads are started again.

The principle of the VRC method is to divide the sequence of pictures into two or more threads in such a way that all pictures are assigned to one of the threads in a round-robin fashion. Each thread is coded independently. The frame rate within one thread is lower than the overall frame rate: half in the case of two threads, a third in the case of three threads and so on. This leads to a substantial coding penalty because of the generally larger changes and the longer motion vectors typically required to represent accurately the motion related changes between two P-pictures within a thread. At regular intervals all threads converge into a so-called sync frame. From this sync frame, a new series of threads is started.

If one of the threads is corrupted (e.g. because of packet loss), the remaining threads can be used to predict the next sync frame. It is possible to continue the decoding of the damaged thread, which typically leads to slight picture degradation, or to stop its decoding which leads to a decrease in the frame rate. If the length of the threads is kept reasonably small, however, both forms of degradation will persist for a relatively short time, i.e. until the next sync frame is reached.

Sync frames are always predicted from one of the undamaged threads. This means that the number of transmitted I-pictures can be kept small, because there is no need for complete re-synchronization. Only if all threads are damaged between two sync frames, is correct sync frame prediction no longer possible. In this situation, annoying artefacts will be present until the next I-picture is decoded correctly, as would have been the case without employing VRC.

SUMMARY OF THE INVENTION

According to a first aspect of the invention there is provided a method of encoding a video signal representing a sequence of pictures, the method comprising encoding at least part of a first picture of the sequence without reference to another picture of the sequence and encoding said at least part of the first picture with reference to another picture of the sequence to produce a corresponding temporally predicted picture.

The invention is applicable whenever a frame or part of a frame is encoded in an INTRA manner. When the encoder encodes a frame (or part of a frame) in an INTRA manner, the encoder also encodes the frame (or part of the frame) again, this time in a temporally predictive manner with reference to another frame within the video sequence.

The invention enables INTRA picture recovery at a decoder even if the original INTRA picture is lost or corrupted. Interaction between the transmitter and the receiver is not needed to recover the INTRA picture. In addition, in certain situations the invention results in lower bit rate overheads than prior art forward error correction methods.

Preferably every picture (or picture segment) encoded without reference to another picture is also encoded with reference to another picture of the sequence.

The first picture (or picture segment) may be encoded with reference to another picture occurring in the sequence temporally prior to said first picture and/or with reference to another picture occurring in the sequence temporally after said first picture. The first picture (or picture segment) may be encoded a plurality of times with reference to other pictures occurring in the sequence.

In a second aspect of the invention there is provided a video encoder comprising an input for receiving a video signal representing a sequence of pictures, the encoder being arranged to encode a first picture of the sequence or part thereof without reference to another picture of the sequence and to encode said first picture or part thereof with reference to another picture of the sequence to produce a corresponding temporally predicted picture.

The invention also extends to a video codec and a multimedia system including a video encoder according to the invention.

In a further aspect of the invention there is provided a method of encoding a video signal representing a sequence of pictures, the method comprising encoding a segment of a first picture of the sequence without reference to another picture of the sequence and encoding at least said segment of said first picture with reference to another picture of the sequence to produce a corresponding temporally predicted picture segment.

A method of video decoding is also encompassed, comprising receiving a signal representing encoded pictures of a video sequence, determining whether a picture that is not temporally predicted or part of a picture that is not temporally predicted has been corrupted and, if so, monitoring for a temporally-predicted representation of the picture or part thereof and, on receipt of the temporally-predicted representation of the picture or part thereof, decoding the picture or part thereof with reference to another picture.

In a further aspect of the invention there is also provided a video decoder comprising an input for receiving a signal representing encoded pictures of a video sequence, said video decoder being arranged to determine whether a non-temporally predicted frame or part thereof has been corrupted and, if so, to monitor for a temporally-predicted representation of the frame or part thereof and, on receipt of the temporally-predicted representation of the frame or part thereof, to decode the temporally-predicted representation of the frame or part thereof with reference to another frame.

The invention extends to a portable electronic device incorporating a video encoder or video decoder according to the invention.

BRIEF DESCRIPTION OF THE DRAWINGS

The invention will now be described, by way of example only, with reference to the accompanying drawings, in which.

DETAILED DESCRIPTION OF THE PREFERRED EMBODIMENTS OF THE INVENTION

Figure 1:
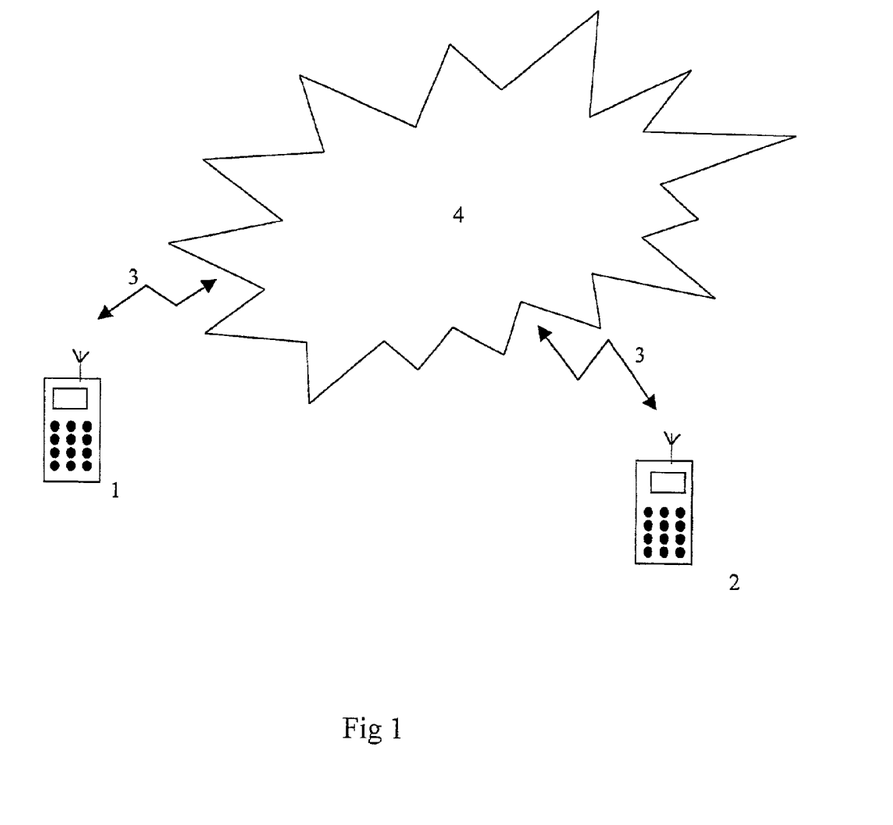
FIG. 1 shows a multimedia mobile communications system.

FIG. 1 shows a typical multimedia mobile communications system. A first multimedia mobile terminal 1 communicates with a second multimedia mobile terminal 2 via a radio link 3 to a mobile communications network 4. Control data is sent between the two terminals 1,2 as well as multimedia data.

Figure 2:
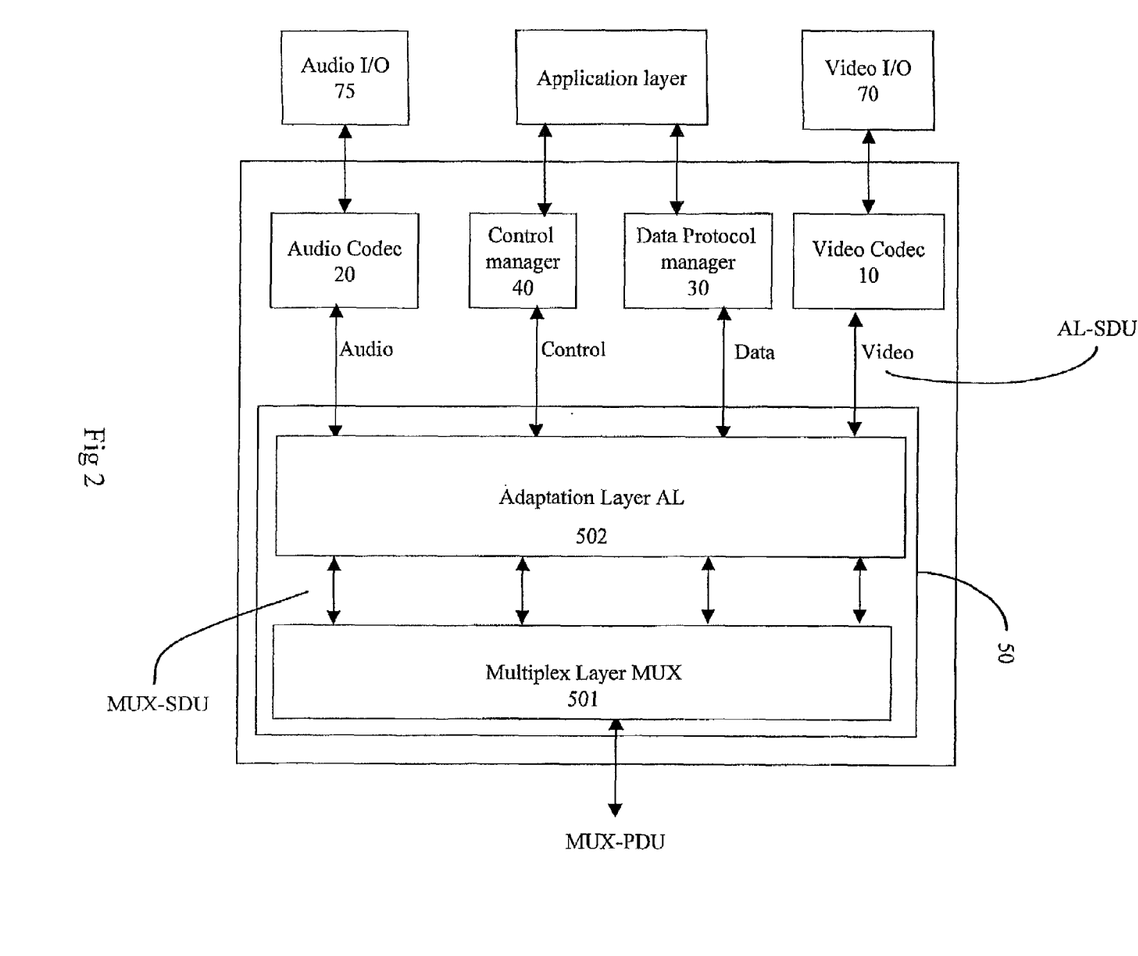
FIG. 2 shows an example of the multimedia components of a multimedia terminal.

FIG. 2 shows the typical multimedia components of a terminal 1. The terminal comprises a video codec 10, an audio codec 20, a data protocol manager 30, a control manager 40, a multiplexer/demultiplexer 50 and a modem 60 (if required). The video codec 10 receives signals for coding from a video input/output device 70 of the terminal (e.g. a camera) and receives signals for decoding from a remote terminal 2 for display by the terminal 1 on a display of the video input/output device 70. The audio codec 20 receives signals for coding from an audio input/output device 75, (e.g. a microphone) of the terminal 1 and receive signals for decoding from a remote terminal 2 for reproduction by the audio input/output device 75, (e.g. a loudspeaker) of the terminal 1. The terminal may be a portable radio communications device, such as a radio telephone.

The control manager 40 controls the operation of the video codec 10, the audio codec 20 and the data protocols manager 30. However, since the invention is concerned with the operation of the video codec 10, no further discussion of the audio codec 20 and protocol manager 30 will be provided.

Figure 3:
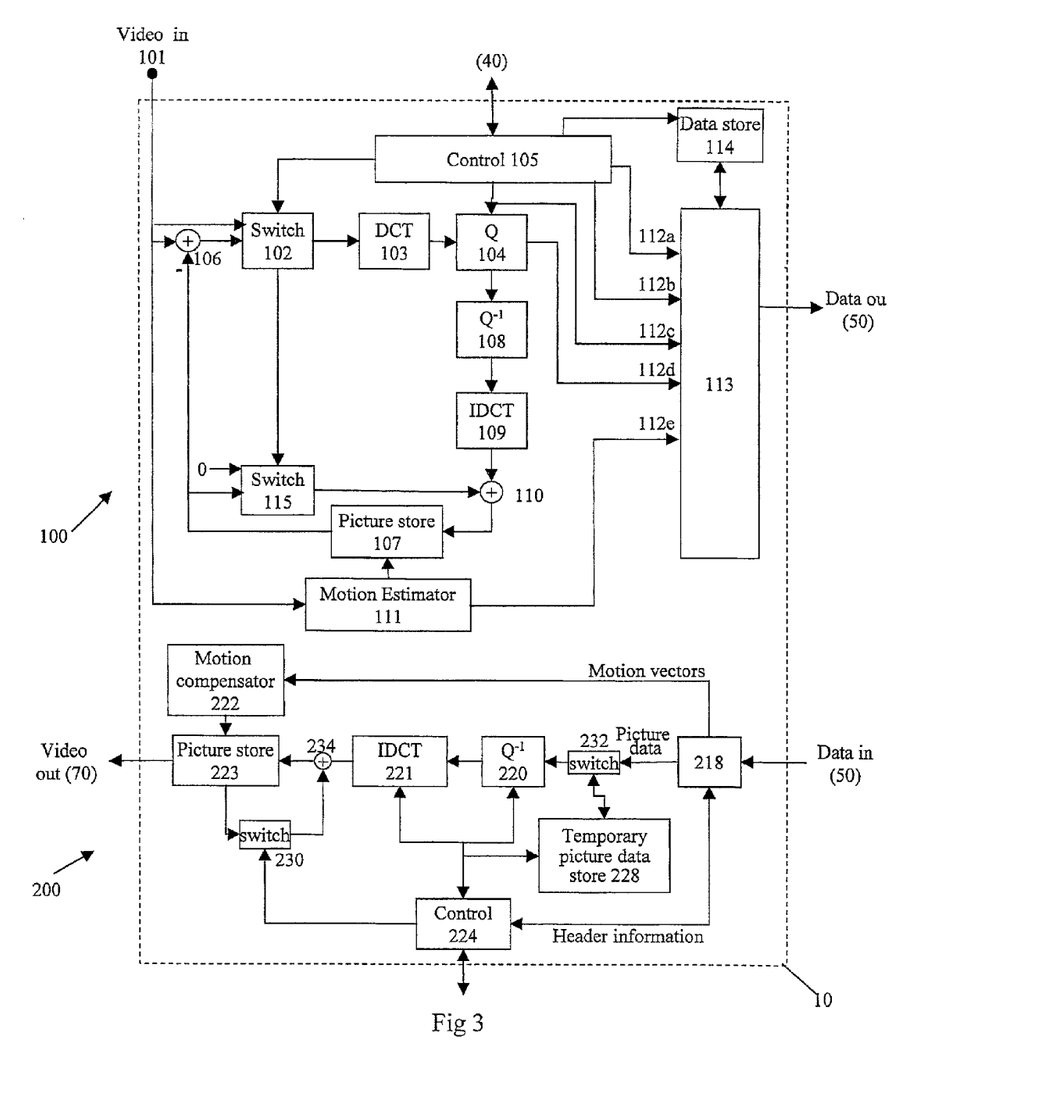
FIG. 3 shows an example of a video codec.

FIG. 3 shows an example of a video codec 10 according to the invention. The video codec comprises an encoder part 100 and a decoder part 200. The encoder part 100 comprises an input 101 for receiving a video signal from a camera or video source (not shown) of the terminal 1. A switch 102 switches the encoder between an INTRA-mode of coding and an INTER-mode. The encoder part 100 of the video codec 10 comprises a DCT transformer 103, a quantiser 104, an inverse quantiser 108, an inverse DCT transformer 109, an adder 110, one or more picture stores 107, a subtractor 106 for forming a prediction error, a switch 115 and an encoding control manager 105.

The decoder part 200 of the video codec 10 comprises an inverse quantiser 220, an inverse DCT transformer 221, a motion compensator 222, a plurality of picture stores 223 and a control 224. The control 224 receives video codec control signals demultiplexed from the encoded multimedia stream by the demultiplexer 50. In practice the control 105 of the encoder and the control 224 of the decoder may be the same processor.

The operation of an encoder according to the invention will now be described. The video codec 10 receives a video signal to be encoded. The encoder 100 of the video codec encodes the video signal by performing DCT transformation, quantisation and motion compensation. The encoded video data is then output to the multiplexer 50. The multiplexer 50 multiplexes the video data from the video codec 10 and control data from the control 40 (as well as other signals as appropriate) into a multimedia signal. The terminal 1 outputs this multimedia signal to the receiving terminal 2 via the modem 60 (if required).

In INTRA-mode, the video signal from the input 101 is transformed into DCT co-efficients by a DCT transformer 103. The DCT coefficients are then passed to the quantiser 104 where they are quantised. Both the switch 102 and the quantiser 104 are controlled by the encoding control manager 105 of the video codec, which may also receive feedback control from the receiving terminal 2 by means of the control manager 40. A decoded picture is then formed by passing the data output by the quantiser through the inverse quantiser 108 and applying an inverse DCT transform 109 to the inverse-quantised data. The resulting data is added to the picture store 107 by the adder 110, switch 115 being operated to present no data to the adder 110.

In INTER mode, the switch 102 is operated to accept from the subtractor 106 the difference between the signal from the input 101 and a reference picture stored in the picture store 107. The difference data output from the subtractor 106 represents the prediction error between the current picture and the reference picture stored in the picture store 107. A motion estimator 111 may generate motion compensation data from the data in the picture store 107 in a conventional manner.

The encoding control manager 105 decides whether to apply INTRA or INTER coding or whether to code the frame at all on the basis of either the output of the subtractor 106 or in response to feedback control data from a receiving decoder and operates the switch 102 accordingly. The encoding control manager may decide not to code a received frame at all when the similarity between the current frame and the reference frame is sufficient or there is not time to code the frame.

When not responding to feedback control data, the encoder typically encodes a frame as an INTRA-frame either only at the start of coding (all other frames being P-frames), or at regular periods e.g. every 5 s, or when the output of the subtractor exceeds a threshold i.e. when the current picture and that stored in the picture store 107 are judged to be too dissimilar to enable efficient temporal prediction. The encoder may also be programmed to encode frames in a particular regular sequence e.g. I B B P B B P B B P B B P B B I B B P etc.

The video codec outputs the quantised DCT coefficients of an INTRA coded picture or prediction error data of an INTER coded picture 112a, the quantising index 112b (i.e. the details of the quantiser used), an INTRA/INTER flag 112c to indicate the mode of coding performed (I or P/B), a transmit flag 112*d* to indicate the number of the frame being coded and the motion vectors 112*e* in the case of an INTER picture being coded. These are multiplexed together by the multiplexer 50 together with other multimedia signals.

Figure 4:
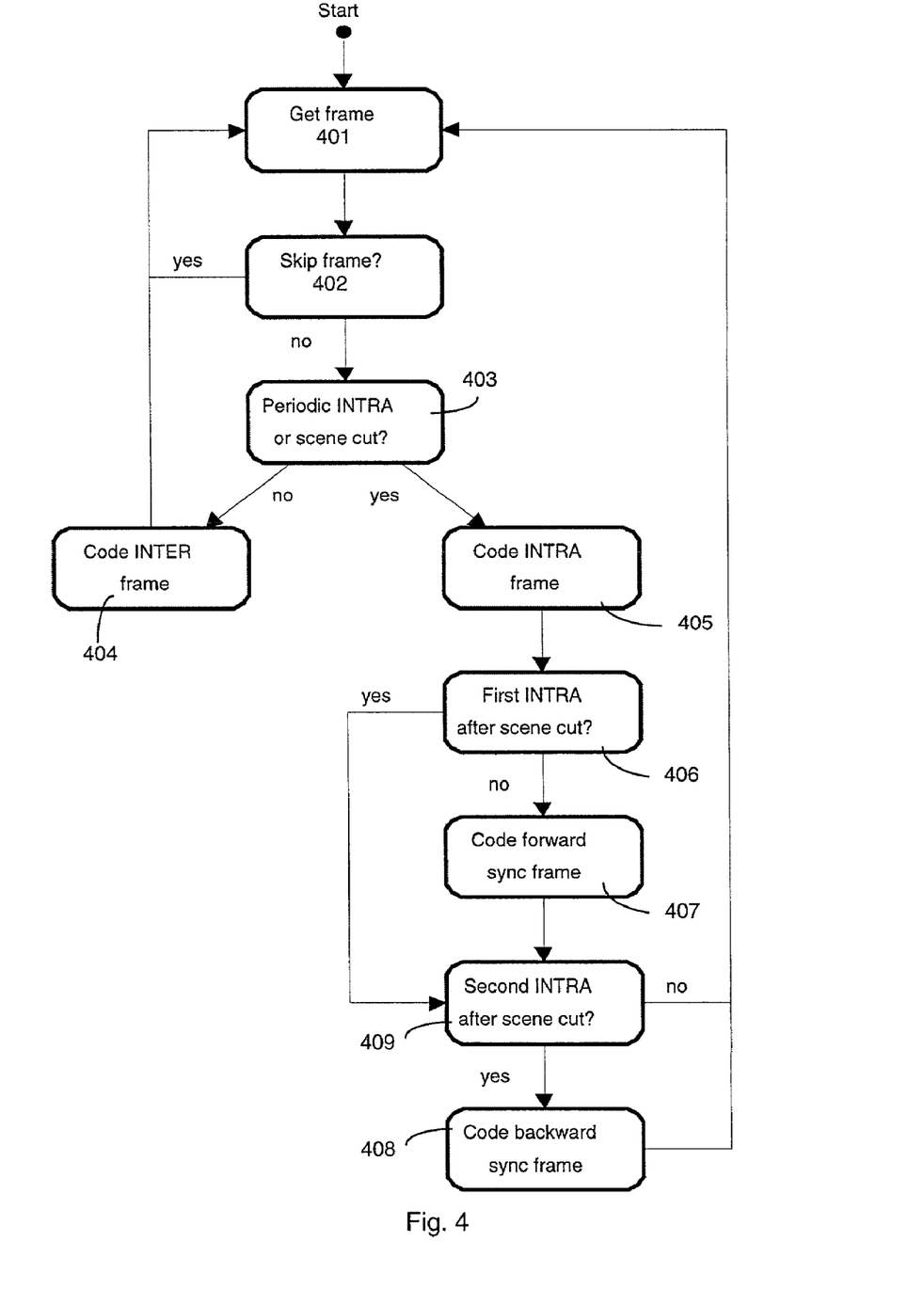
FIG. 4 is a flow diagram illustrating the operation of a video encoder according to the invention.

FIG. 4 is a flow diagram illustrating the operation of an encoder according to a first embodiment of the invention. The encoder creates one or more temporally predicted frames corresponding to an INTRA coded frame as well as the INTRA coded frame itself. For simplicity the description only refers to the handling of INTER and INTRA frames. The handling of other types of frames (e.g. B-frames) has been omitted from the description. These are handled in a conventional manner.

Firstly the encoder receives a frame (401). The encoder decides (in a conventional manner) whether to code the frame or to skip it (402). If a decision is made to code the frame, the encoder decides (403) whether to code the frame as an INTER frame (404) or an INTRA frame (405). In the former case, the frame is coded (404) in a conventional temporally predictive manner. In the latter case, the frame is coded (405) in a conventional non-temporally predictive manner. The decision to encode the frame as an INTRA frame (405) may be in response to a periodic INTRA request set up in the encoder or in response to a specific request received from a receiving decoder. Alternatively, it may be in response to the encoder determining that there is significant change in picture content which makes the use of an INTRA picture beneficial from the point of view of compression efficiency. This may also be referred to informally as a scene cut.

The invention is applicable whenever a frame or segment of a frame is encoded in an INTRA manner. When the encoder encodes a frame as an INTRA frame, the encoder also encodes the frame (or segment of the frame) again (407, 408), this time in a temporally predictive manner with reference to another frame within the video sequence.

For all but the first frame of the video sequence, a frame that has been INTRA-coded is also encoded (407) in a temporally predictive manner with reference to a frame occurring within the video sequence temporally prior to the frame to be coded i.e. by forward prediction. This exception may also be the case for the first INTRA coded frame after a scene cut.

If the encoder determines (406) that the frame is the first INTRA frame to be coded (or the first INTRA frame to be coded after a scene cut), the encoder encodes the frame again (408), this time in a predictive manner with reference the INTRA frame that occurs immediately after a visual-content discontinuity e.g. a scene cut). The method of selection of a reference picture for such a INTRA-picture is different from that used for I4. Instead, the second representation of picture 0 is an INTER picture predicted (and motion-compensated) with reference to the picture that corresponds to the next periodic INTRA picture (picture 4 in the example). If I0 is corrupted, a receiver may wait until I4 and P0 have been received, after which it can reconstruct picture 0. Again P0 may be predicted from a picture other than frame I4, but prediction from the temporally nearest frame that has been coded in an INTRA manner is preferred.

The encoded data may be transmitted in the order in which it is encoded i.e. I0, P1, P2, P3, I4, P4, P0, P5 . . . etc. Alternatively the frames of data may be re-ordered.

Considering the terminal 1 as receiving coded video data from terminal 2, the operation of the video codec 10 will now be described with reference to its decoding role. The terminal 1 receives a multimedia signal from the transmitting terminal 2. The demultiplexer 50 demultiplexes the multimedia signal and passes the video data to the video codec 10 and the control data to the control manager 40. The decoder 200 of the video codec decodes the encoded video data by inverse quantising, inverse DCT transforming and motion compensating the data. The controller 124 of the decoder checks the integrity of the received data and, if an error is detected, attempts to conceal the error in a manner to be described below. The decoded, corrected and concealed video data is then stored in one of the picture stores 223 and output for reproduction on a display 70 of the receiving terminal 1.

Errors in video data may occur at the picture level, the picture segment level (e.g. GOB (Group of Blocks) or slice level) or the macroblock level. Error checking may be carried out at any or each of these levels. to a frame occurring within the video sequence temporally after the frame to be coded i.e. by backward prediction. The encoder therefore has to wait until a subsequent frame has been received for encoding before it can encode the predicted frame with reference to the subsequent frame.

In the example shown in FIG. 4, the encoder waits (409) until the next INTRA frame has been encoded and then generates (408) the backward predicted representation of the earlier INTRA-coded frame with reference to the second INTRA frame of the scene.

All INTRA pictures after the first INTRA picture of a video sequence may have temporally predicted representation(s) encoded in a forward prediction manner and/or a backward prediction manner.

Figure 5:
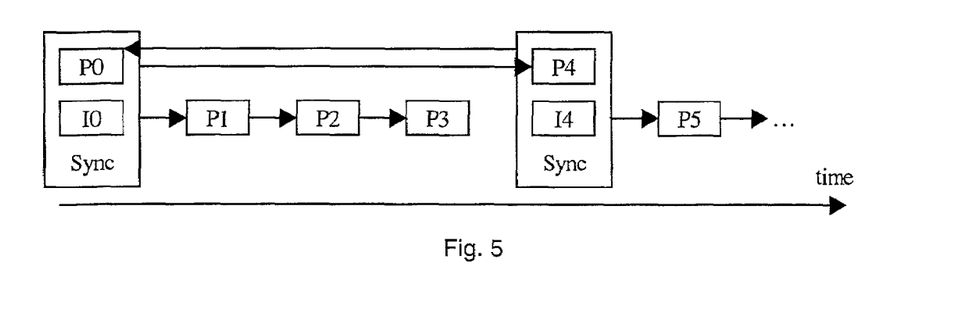
FIG. 5 shows an example of the output of a first embodiment of a video encoder according to the invention.

FIG. 5 shows the frame-by-frame output of an encoder according to the invention. I0 is an INTRA coded picture appearing at the very beginning of a video sequence (or after a scene cut). The system shown uses periodic INTRA pictures, and I4 is such a picture. In order to protect I0 and I4 from transmission errors, a second representation of each INTRA coded picture is temporally predictively encoded and transmitted. The second representation of picture 4 is an INTER picture predicted (and motion-compensated) with reference to picture 0. This second representation is indicated by P4 in FIG. 5. P4 could be predicted from any of the preceding frames, I0, P1, P2, or P3. Picture 0 is preferably chosen because otherwise P4 would be vulnerable to any transmission errors in the prediction path starting from I0. A receiving decoder can use any representation of picture 4 to reconstruct a picture for display/reference.

To protect picture 0 from transmission errors, a second representation of the same picture is coded and transmitted. Picture 0 is the first INTRA coded frame of a video sequence. This may be of an entire video sequence or may be the first INTRA coded frame of a subset of an entire video sequence (e.g.

Figure 6:
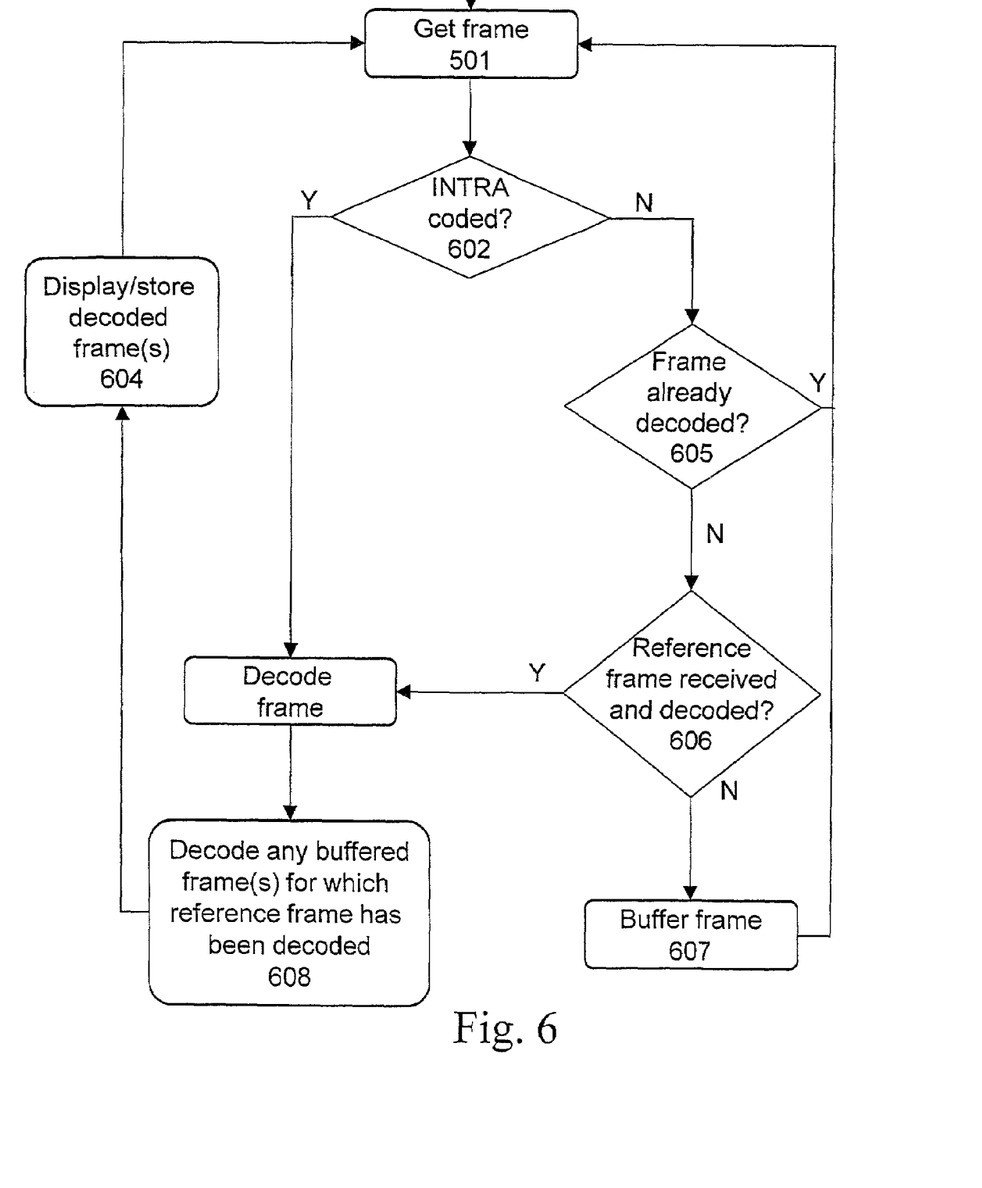
FIG. 6 is a flow diagram illustrating the operation of a video decoder according to a first embodiment of the invention.

FIG. 6 is a flow chart illustrating a video decoder according to the invention. Considering first the signal as illustrated in FIG. 5, when a decoder according to the invention receives this signal each frame of the signal is decoded in a conventional manner and then displayed on a display means. The decoded frame may be error corrected and error concealed in a conventional manner. Each time a frame is decoded, the decoder determines when the frame is to be displayed. This may be done by examining a temporal reference (TR) field of the header of the frame or, if the video is transmitted in packets, the time-stamps of the packets may be examined.

Consider the pictures shown in FIG. 5, transmitted in the following order: I0, P1, P2, P3, I4, P4, P0, P5 . . . etc. The decoder receives picture I0 (501) and determines (602) from its picture header that the picture is INTRA-coded. The decoder decodes picture I0 (608) without reference to any other picture, displays it and stores it in picture store 223a (604). The decoder then receives picture P1 (501) and determines (602) from its picture header that the picture is INTER-coded as a P-picture. The decoder determines whether picture 1 has already been decoded (605). Since picture 1 has not already been decoded, the decoder checks whether the reference picture for P1 has been received and decoded (606). As picture 0 has been received and decoded, the decoder decodes picture P1 (608) with reference to the reference picture 0, displays it and stores it in the next picture store 223b (604). The decoder then receives picture P2 (501) and determines (602) from its picture header that the picture is INTER-coded as a P-picture. Picture 2 has not been decoded (605) and the reference picture 1 has been decoded (606) so the decoder therefore decodes picture P2 with reference to the preceding reference picture 1, displays it and stores it in the next picture store 223c and so on. The same procedure (steps 602, 608, 605 and 606) is followed for INTER coded picture P3.

The next picture to be received is I4. The decoder then determines (602) from its picture header that the picture is INTRA-coded and decodes the picture.

The decoder then receives picture P4 (501) and determines (602) from its picture header that the picture is INTER-coded as a P-picture. However the decoder notes (605) that picture 4 has already been successfully decoded and discards picture P4 and receives the next picture of data P0. The decoder determines (602) from its picture header that the picture is INTER-coded as a P-picture. However the decoder notes (605) that picture 0 has akeady been decoded, discards picture P0 and subsequently receives the next picture of data P5. This picture is then decoded with reference to decoded picture 4.

The above description describes what happens when no errors occur during transmission. Consider now the situation in which the decoder is unable to decode successfully the INTRA coded frame I0. This may be because the data for the frame has been lost completely during transmission or some of the data for the frame has been corrupted in such as way that it is not recoverable satisfactorily. When frame P1 is received, the decoder determines that frame 1 has not yet been decoded (605) and that the reference frame for P1 has not been received and decoded (606). The decoder then buffers the data for P1 (607). The same action is taken for P2 and P3.

When I4 is received successfully, the decoder decodes I4 without reference to any other frame. When P4 is received it is ignored because picture 4 has already been decoded (605). When P0 is received the decoder determines that picture 0 has not already been decoded (605) and that the reference picture for P0 (picture 4) has been decoded (606). The decoder therefore decodes (608) frame P0 with reference to picture 4. Since picture 0 has now been decoded, it is possible to decode any buffered frames for which picture 0 was the reference picture. Thus the decoder decodes (608) the buffered frame P1 with reference to picture 0. After decoding frame 1, the decoder is also able to decode the buffered frame P2 and, after decoding frame 2, the decoder is also able to decode the buffered frame P3.

The decoder discards the buffered frames if the decoder does not receive a reference frame for the buffered frames. The decoder may be arranged to discard the buffered frames if the reference picture for the buffered frames is not received within a given time or when an INTRA-coded frame is received.

Figure 7:
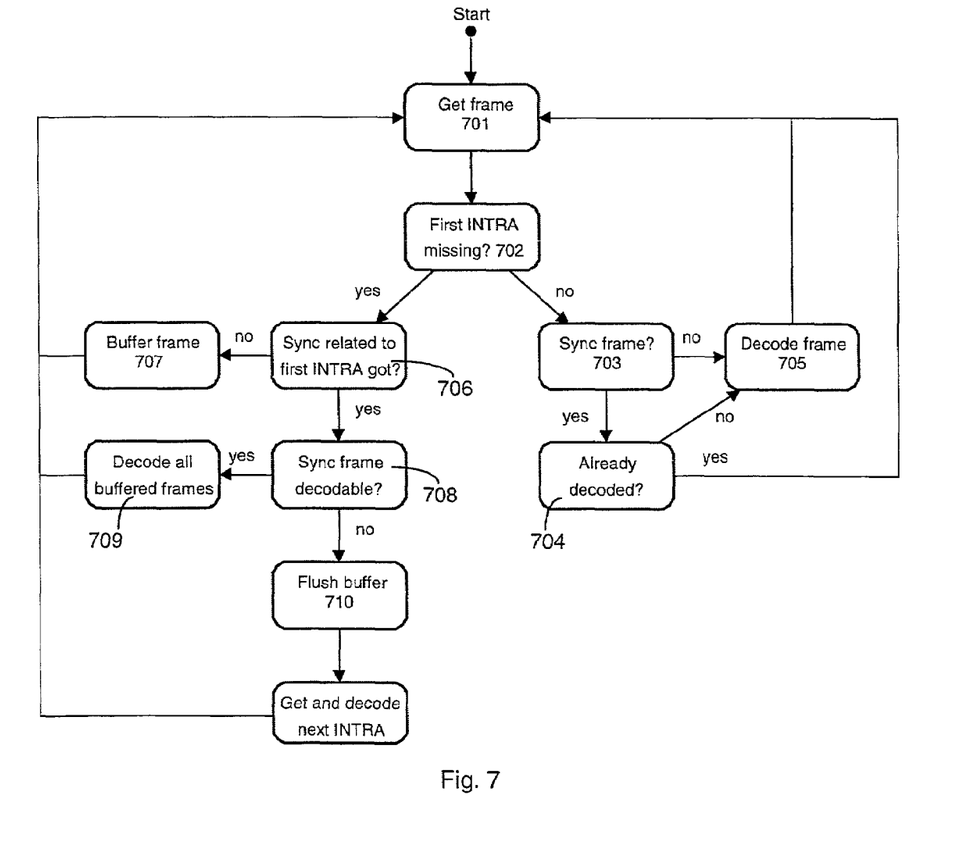
FIG. 7 is a flow diagram illustrating the operation of a video encoder according to a second embodiment of the invention.

FIG. 7 is a flow chart also illustrating a second embodiment of a video decoder according to the invention, which is capable of detecting scene changes. The decoder receives (701) a signal for decoding. The decoder detects (702) if there has been a scene cut between the latest decoded frame and if the INTRA picture following the scene cut is missing. This may be done for instance by examining a scene identifier in the header of the encoded frame or by examining the picture number of the frame, as set out in Annex W of H.263. In this latter case, the decoder can deduce from the picture number that a picture is missing and, if the next picture after a missed one does not indicate a spare reference picture number, the decoder assumes that the lost picture is an INTRA picture associated with a scene cut.

If the INTRA picture immediately following a scene cut is not missing, the decoder checks (703) if the frame being decoded is a redundant representation of a frame that has already been decoded (called a sync frame in the figure). In H.263, such a redundant representation may be indicated by giving the encoded frame the same TR as the primary representation of the picture.

If the frame is not a sync frame or if the primary representation of the sync frame has not been decoded (704), the decoder decodes the frame (705) and continues from the beginning of the loop. Otherwise, the decoder skips the decoding and continues from the beginning of the loop (701).

If the first INTRA picture (or that following a scene cut) is missing, the decoder starts to monitor (706) for the receipt of the backward-predicted frame corresponding to the first INTRA picture. The decoder knows that this particular frame should appear after the next periodic INTRA picture. All frames preceding the expected backward-predicted frame are buffered (707) (in compressed format). When the backward-predicted sync frame is due to appear in the bit-stream, the buffering is stopped. The next received frame is decoded (708) if it and the first periodic INTRA picture (i.e. the second INTRA picture in the scene) are received correctly. After that, all of the buffered frames are decoded (709), and then decoding can continue normally as if the first INTRA picture of the scene were never missing. Otherwise, the decoder cannot decode the buffered frames but rather it must discard them (710) and wait (711) for the next INTRA picture to arrive and continue decoding normally after decoding it.

Frame buffering has two implications. Firstly, the playback (displaying) process should use buffering to absorb the jitter introduced by the decoding process. This kind of a buffer is typical in video streaming and therefore the invention does not necessarily cause any modifications to the displaying process. Secondly, all buffered frames are decoded as soon as the reference frame is decoded. In practice this means that there may be a burst of computational activity when the first INTRA picture (I0) of a scene is lost and a subsequent representation (P0) of the picture of the scene is decoded. The decoder should be fast enough so that it has the resources to make up the time spent on buffering and so that uncompressed frames do not remain in the buffers for a long time.

The typical encoding/decoding order would be:

I0, P1, P2, . . . , Pn−1, In, Pn, P0, Pn+1, Pn+2, where I means an INTRA picture, P means an INTER picture, the index corresponds to relative capturing/displaying time, and time instant n corresponds to the first periodic INTRA frame after a scene cut.

Figure 8:
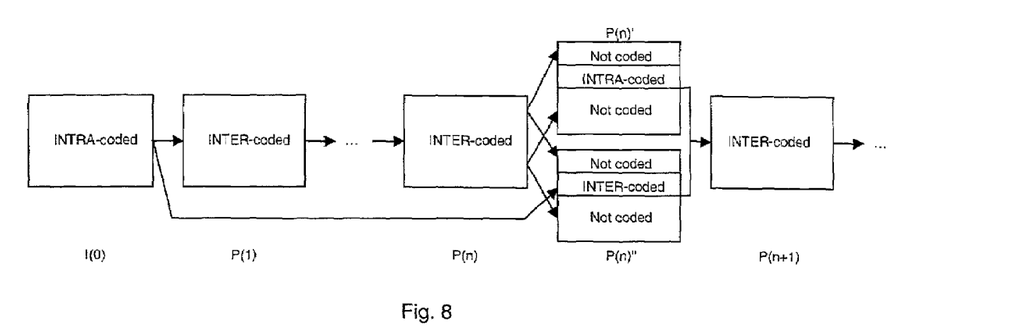
FIG. 8 illustrates a further embodiment of the invention.

The processing power requirement at the decoder can be minimised by re-ordering the transmitted frames compared with the typical encoding/decoding order, i.e., the transmitter can send the frames in the following order:

I0, In, P0, Pn, P1, P2, . . . , Pn−1, Pn+1, Pn+2,

The invention is applicable to schemes where some segments of a picture are INTRA-coded and others INTER-coded. This is illustrated in FIG. 8. Firstly, the bit-stream is coded in a conventional manner. When the encoder decides to update a picture segment in an INTRA manner, it carries out the following three operations:

1. The encoder codes the picture as a normal INTER-picture P(n).

2. The encoder codes P(n)', which is a redundant representation of P(n) where the desired picture segment is INTRA coded and other picture segments remain unchanged from P(n). The time-stamp of this newly coded picture is as close as possible to P(n).

3. The encoder encodes P(n)", which is a secondary representation of P(n)'. In P(n)", the picture segment of P(n)' that was coded in an INTRA manner is INTER-coded. Preferably the reference picture used is the latest picture (other than P(n)') in which the corresponding segment was INTRA-coded. The encoder may limit motion vectors to point only inside the picture segment in order to prevent the propagation of possible decoding errors from the neighbouring segments. Alternatively, the encoder may use a coding mode such as H.263 Independent Segment Decoding (Annex R), which inherently prevents prediction from neighbouring picture segments. Other picture segments of P(n)" remain unchanged from P(n).

After that, the encoder continues coding normally.

The decoder operates similarly to the one described earlier. If the picture segment in P(n) is not corrupted, P(n)' and P(n)" are redundant and may be discarded. Otherwise, the decoder can use either P(n)' or P(n)" to recover the corrupted picture segment.

The error resilience of the invention can be improved if the transmitter sends multiple copies of a temporally predicted frame corresponding to an INTRA frame. The multiple copies may be predicted from different reference pictures in a forward or backward manner. To maximise error protection, these frames should be encapsulated into different packets. Moreover, it is beneficial if each INTRA picture is associated with both forward- and backward-predicted corresponding pictures.

The invention can be used in conversational, low-delay applications. In applications that do not buffer decoded frames before displaying them (but rather display decoded frames more or less immediately), corresponding backward predicted frames cannot be used by a decoder. Thus, a transmitting encoder for such applications (e.g. conversational applications) may be arranged not to code corresponding backward predicted frames for INTRA frames. Consequently, the first INTRA picture will not be protected in accordance with the invention.

Figure 9:
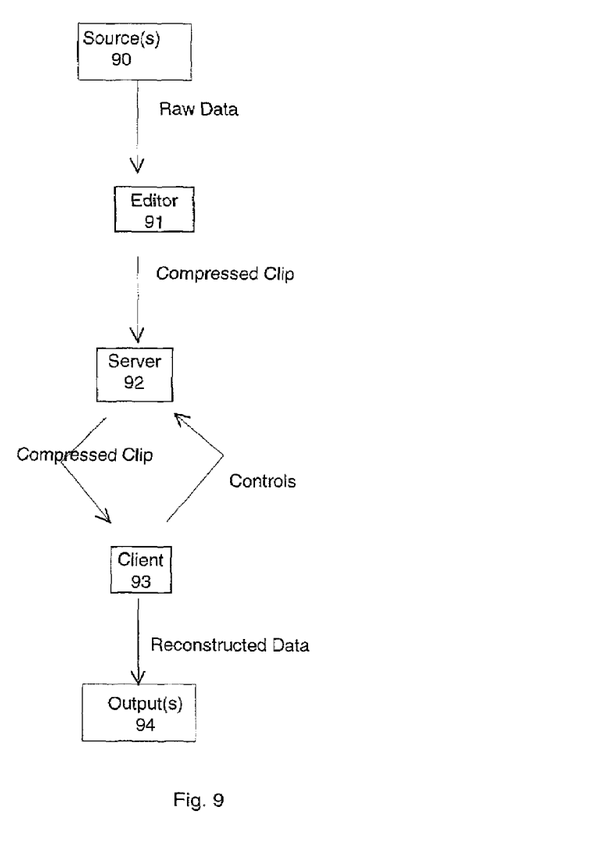
FIG. 9 shows a multimedia content creation and retrieval system into which a video encoder and/or decoder according to the invention may be incorporated.

The framework of an entire multimedia content creation and retrieval system will now be described with reference to FIG. 9. The system has one or more media sources 90, e.g. a camera and a microphone. Multimedia content can be synthetically created e.g. animated computer graphics and digitally generated music. To compose a multimedia clip consisting of different media types, the raw data captured from the sources are edited by an editing system 91. Typically the storage space required for raw multimedia data is huge. To facilitate an attractive multimedia retrieval service over low bit rate channels, multimedia clips are also compressed in the editing system 91. Then the clips are handed to a multimedia server 92. Typically, a number of clients 93 can access the server over a network. The server 92 is able to respond to requests presented by the clients 93. The main task for the server is to transmit a desired multimedia clip to a given client. The client 93 decompresses and plays the clip. In the playback phase, the client utilizes one or more output devices 94, e.g. the screen and the loudspeaker of the client. In the system shown in FIG. 9, the server incorporates a video encoder according to the invention and the client incorporates a video decoder according to the invention. In applications involving two-way video transmission, both the server and the clients incorporate video codec according to the invention.

In a mobile multimedia retrieval system, at least part of the link connecting a client 93 and the server 92 is wireless e.g. by radio.

Typically, multimedia servers 92 have two modes of operation, namely they deliver either pre-stored multimedia clips or live (real-time) multimedia streams. In the former case, clips are stored on a server database, which is then accessed on an on-demand basis by the server for the client(s). In the latter case, multimedia clips are handed to the server as a continuous media stream that is immediately transmitted to clients 93. A server can remove and compress some of the header information produced by a multiplexing format as well as encapsulate the media clip into network packets.

The clients 93 control the operation of the server 92 using a control protocol. The minimum set of controls consists of a function to select a desired media clip. In addition, servers may support more advanced controls. For example, clients may be able to stop the transmission of a clip, to pause and resume the transmission of a clip, and to control the media flow if the throughput of the transmission channel varies, in which case the server dynamically adjusts the bit stream to fit into the available bandwidth.

The client 93 receives a compressed and multiplexed media clip from the multimedia server 92. First, the client demultiplexes the clip in order to retrieve the separate media tracks and then decompresses these media tracks. After that, the decompressed (reconstructed) media tracks are played on output devices 94. In addition to these operations, a controller unit interfaces with an end-user, controls the playback according to the user input and handles client-server control traffic. The demultiplexing-decompression-playback chain can be carried out while still downloading a subsequent part of the clip. This is commonly referred to as streaming. Alternatively, the whole clip is downloaded to the client 93 and then the client demultiplexes, decompresses and plays it.

The invention is not intended to be limited to the video coding protocols discussed above: these are intended to be merely exemplary. The invention is applicable to any video coding protocol using temporal prediction. The addition of additional INTER frames corresponding to INTRA frames as discussed above introduces error resilience into the encoded signal and allows a receiving decoder to select alternative decoding options if part of the received signal is corrupted.

What is claimed is:

1. A method of encoding a video signal representing a sequence of pictures to form an encoded video signal, the method comprising receiving a first picture or a part thereof, encoding the first picture or said part thereof, using a first encoding mode, without reference to another picture of the sequence to form a first encoded representation of the first picture or said part thereof, and encoding said first picture or said part thereof, using a second encoding mode, with reference to another picture of the sequence to produce a corresponding temporally predicted second encoded representation of the first picture or said part thereof.

2. A method according to claim 1, wherein every picture or part thereof encoded without reference to another picture is also encoded with reference to another picture of the sequence to form a corresponding temporally predicted second encoded representation of each respective picture or part.

3. A method according to claim 1, wherein said first picture or part thereof is encoded with reference to another picture occurring in the sequence temporally prior to said first picture.

4. A method according to claim 1, wherein said first picture or part thereof is encoded with reference to another picture occurring in the sequence temporally after said first picture.

5. A method according to claim 1, wherein said first picture or part thereof is encoded with reference to one or more other pictures occurring in the sequence.

6. A video encoder comprising
an input for receiving a video signal representing a sequence of pictures, the encoder being arranged to encode a first picture of the sequence or a part thereof, received at the input, using a first encoding mode, without reference to another picture of the sequence to form a first encoded representation of the first picture or said part thereof, and to encode said first picture or said part thereof, using a second encoding mode, with reference to another picture of the sequence to produce a corresponding temporally predicted second encoded representation of the first picture or said part thereof.

7. A video codec including a video encoder, the video encoder comprising an input for receiving a video signal representing a sequence of pictures, the encoder being arranged to encode a first picture of the sequence or a part thereof, received at the input, using a first encoding mode, without reference to another picture of the sequence to form a first encoded representation of the first picture or said part thereof, and to encode said first picture or said part thereof, using a second encoding mode, with reference to another picture of the sequence to produce a corresponding temporally predicted second encoded representation of the first picture or said part thereof.

8. A multimedia system including a video encoder, the video encoder comprising an input for receiving a video signal representing a sequence of pictures, the encoder being arranged to encode a first picture of the sequence or a part thereof, received at the input, using a first encoding mode, without reference to another picture of the sequence to form a first encoded representation of the first picture or said part thereof, and to encode said first picture or said part thereof, using a second encoding mode, with reference to another picture of the sequence to produce a corresponding temporally predicted second encoded representation of the first picture or said part thereof.

9. A method of encoding a video signal representing a sequence of pictures to form an encoded video signal, the method comprising receiving a segment of a first picture or part thereof, encoding the segment of the first picture or part thereof using a first encoding mode without reference to another picture of the sequence to form a first encoded representation of the first picture segment or said part thereof, and encoding at least said segment of said first picture or part thereof using a second encoding mode with reference to another picture of the sequence to produce a corresponding temporally predicted second encoded representation of the first picture segment or said part thereof.

10. A method of video decoding comprising receiving an encoded video signal representing encoded pictures of a video sequence, the encoded video signal comprising a first encoded representation of a first picture or a part thereof, said first encoded representation having been formed, using a first encoding mode, by encoding said first picture or said part thereof without reference to another picture of the sequence, the encoded video signal further comprising a temporally predicted second encoded representation of the first picture or said part thereof, said temporally predicted second encoded representation having been formed, using a second encoding mode, by encoding said first picture or said part thereof with reference to another picture of the sequence, the method comprising determining whether the first encoded representation of the first picture or said part thereof can be decoded and, if not, monitoring the received encoded video signal for the temporally predicted second encoded representation of the first picture or said part thereof and, on receipt of the temporally predicted second encoded representation of the first picture or said part thereof, decoding the temporally predicted second encoded representation of the first picture or said part thereof with reference to said another picture.

11. A video decoder comprising:
an input for receiving an encoded video signal representing encoded pictures of a video sequence, the encoded video signal comprising a first encoded representation of a first picture or a part thereof, said first encoded representation having been formed, using a first encoding mode, by encoding said first picture or said part thereof without reference to another picture of the sequence, the encoded video signal further comprising a temporally predicted second encoded representation of the first picture or said part thereof, said temporally predicted second encoded representation having been formed, using a second encoding mode, by encoding said first picture or said part thereof with reference to another picture of the sequence, said video decoder being arranged to determine whether the first encoded representation of a first picture or said part thereof, received from the input, can be decoded and, if not, to monitor the received encoded video signal for the temporally predicted second encoded representation of the first picture or said part thereof and, on receipt of the temporally predicted second encoded representation of the first picture or said part thereof, to control decoding of the temporally predicted second encoded representation of the first picture or said part thereof with reference to said another picture.

12. A portable electronic device incorporating a video encoder the video encoder comprising an input for receiving a video signal representing a sequence of pictures, the encoder being arranged to encode a first picture of the sequence or a part thereof, received at the input, using a first encoding mode, without reference to another picture of the sequence to form a first encoded representation of the first picture or said part thereof, and to encode said first picture or said part thereof, using a second encoding mode, with reference to another picture of the sequence to produce a corresponding temporally predicted second encoded representation of the first picture or said part thereof.

13. A multimedia system including a video codec, the codec comprising a video encoder, the video encoder comprising an input for receiving a vide signal al representing a sequence of pictures, the encoder being arranged to encode a first picture of the sequence or a part thereof, received at the input, using a first encoding mode, without reference to another picture of the sequence to form a first encoded representation of the first picture or said part thereof, and to encode said first picture or said part thereof, using a second encoding mode with reference to another picture of the sequence to produce a corresponding temporally predicted second encoded representation of the first picture or said part thereof.

14. A portable electronic device incorporating a video, decoder the video decoder comprising:

an input for receiving an encoded video signal representing encoded pictures of a video sequence, the encoded video signal comprising a first encoded representation of a first picture or a part thereof, said first encoded representation having been formed, using a first encoding mode, by encoding said first picture or said part thereof without reference to another picture of the sequence, the encoded video signal further comprising a temporally predicted second encoded representation of the first picture or said part thereof, said temporally predicted second encoded representation having been formed, using a second encoding mode, by encoding said first picture or said part thereof with reference to another picture of the sequence, said video decoder being arranged to determine whether the first encoded representation of a first picture or part thereof, received from the input, can be decoded and, if not, to monitor the received encoded video signal for the temporally predicted second encoded representation of the first picture or said part thereof and, on receipt of the temporally predicted second encoded representation of the first picture or said part thereof, to control decoding of the temporally predicted second encoded representation of the first picture or said part thereof with reference to said another picture.

15. A system comprising a video encoder and a video decoder, the video encoder comprising:

an input for receiving a video signal representing a sequence of pictures, the encoder being arranged to encode a first picture of the sequence or a part thereof, received at the input, using a first encoding mode, without reference to another picture of the sequence to form a first encoded representation of the first picture or said part thereof, and to encode said first picture or said part thereof, using a second encoding mode, with reference to another picture of the sequence to produce a corresponding temporally predicted second encoded representation of the first picture or said part thereof, the video decoder comprising:

an input for receiving an encoded video signal representing encoded pictures of a video sequence, the encoded video signal comprising a first encoded representation of a first picture or a part thereof, said first encoded representation having been formed, using a first encoding mode, by encoding said first picture or said part thereof without reference to another picture of the sequence, the encoded video signal further comprising a temporally predicted second encoded representation of the first picture or said part thereof, said temporally predicted second encoded representation having been formed, using a second encoding mode, by encoding said first picture or said part thereof with reference to another picture of the sequence, said video decoder being arranged to determine whether the first encoded representation of a first picture or said part thereof, received from the input, can be decoded and, if not, to monitor the received encoded video signal for the temporally predicted second encoded representation of the first picture or said part thereof and, on receipt of the temporally predicted second encoded representation of the first picture or said part thereof, to control decoding of the temporally predicted second encoded representation of the first picture or said part thereof with reference to said another picture.

16. A video encoder according to claim 6, comprising a controller arranged to control processing means to encode a first picture or a part thereof received at the input.

17. A video decoder according to claim 11, comprising a controller arranged to control processing means to decode a video signal received at the input.

18. A video encoder according to claim 6, wherein the first encoding mode is an INTRA coding mode.

19. A video encoder according to claim 6, wherein the second encoding mode is an INTER coding mode.

20. A video encoder according to claim 6, wherein the second encoding mode provides a P frame.

21. A video encoder according to claim 6, wherein the second encoding mode provides a B frame.

22. A video encoder according to claim 6, wherein the second encoding mode is a forward prediction mode.

23. A video encoder according to claim 6, wherein the second encoding mode is a backward prediction mode.

24. A video encoder according to claim 16, wherein the controller is arranged to determine which picture is to be encoded in the first encoding mode based on feedback signalling from a decoder.

25. A video encoder according to claim 16, wherein the controller is arranged to determine which picture is to be encoded in the first encoding mode based on prediction error.

26. A video encoder according to claim 6, wherein the first picture or part thereof is associated with a scene cut.

27. A video encoder according to claim 6, wherein the first picture or part thereof is associated with the very first picture of a video sequence.

28. A video encoder according to claim 16, wherein the controller is arranged to control processing means to encode said first picture or part thereof in said first encoding mode at regular periodic intervals.

29. A video encoder according to claim 6, wherein said other picture corresponds to the picture temporally closest to the first picture or said part thereof, said temporally closest picture or part thereof to be encoded in the first encoding mode.

30. A video encoder according to claim 6, wherein the encoder is arranged to transmit encoded pictures or parts thereof in the order in which the pictures or said parts thereof are encoded.

31. A video encoder according to claim 6, wherein the encoder is arranged to transmit pictures encoded in the first mode in groups without interspersing pictures encoded in a mode other that the first mode.

32. A video encoder according to claim 6, wherein said other picture is a picture encoded in the first mode.

33. A video encoder according to claim 6, wherein the video encoder is arranged to encode a third representation of the first picture or said part thereof, the third representation being encoded with respect to a different other picture than the second representation.

34. A video encoder according to claim 16, wherein the encoder comprises a switch arranged to allow switching of the processing means between the first and second encoding modes.

35. A decoder according to claim 11, wherein the decoder is arranged to discard the second representation of the first picture or said part thereof if the first representation has been previously decoded.

36. A method of encoding a video signal according to claim 1, wherein the first picture or part thereof is associated with a scene cut.

37. A method of encoding a video signal according to claim 1, comprising encoding a third representation of the first picture or said part thereof, the third representation being encoded with respect to a different other picture than the second representation.

38. A method of decoding a video signal according to claim 10, wherein the first picture or part thereof is associated with a scene cut.

39. A method of decoding a video signal according to claim 10, comprising decoding a third representation of the first picture or said part thereof, the third representation being encoded with respect to a different other picture than the second representation.

* * * * *